United States Patent
Stocchiero

[11] Patent Number: 5,846,671
[45] Date of Patent: Dec. 8, 1998

[54] LID FOR BATTERIES

[76] Inventor: Olimpio Stocchiero, via Kennedy, 4—36050, Montorso Vicentino (VI), Italy

[21] Appl. No.: 663,192
[22] PCT Filed: Jan. 4, 1994
[86] PCT No.: PCT/EP94/00008
  § 371 Date: Jun. 11, 1996
  § 102(e) Date: Jun. 11, 1996
[87] PCT Pub. No.: WO95/19050
  PCT Pub. Date:Jul. 13, 1995
[51] Int. Cl.$^6$ ....................................................... H01M 2/04
[52] U.S. Cl. .............................. 429/88; 429/89; 429/175; 429/185
[58] Field of Search ................................ 429/87–89, 175, 429/185, 82, 53, 54, 172, 171

[56] References Cited

U.S. PATENT DOCUMENTS

| | | | |
|---|---|---|---|
| 2,151,424 | 3/1939 | Galamb | 429/88 |
| 4,052,534 | 10/1977 | Devitt | 429/89 X |
| 4,613,550 | 9/1986 | Jergl et al. | 429/53 |
| 5,422,199 | 6/1995 | Adams et al. | 429/88 |

FOREIGN PATENT DOCUMENTS

| | | |
|---|---|---|
| 0305822 | 3/1989 | European Pat. Off. . |
| 0496539 | 7/1992 | European Pat. Off. . |
| 9101356 | 5/1991 | Germany . |

*Primary Examiner*—Anthony Skapars
*Attorney, Agent, or Firm*—Watson Cole Grindle Watson, P. L. L. C.

[57] ABSTRACT

The invention discloses a lid suited to be used on batteries of the "re-combination" type or of the "KAMINA" type realized with a single manufactured article moulded of plastic material. The manufactured article presents an essentially flat surface (6), a series of holes (4) aligned in relation to one another communicating with each element of the battery, a plurality of caps (11) lodged in said holes and a channel (5) for conveying the fumes generated by the battery and having its ends facing the external surface of the lid. With such an embodiment the lid is suited to be used on batteries of the "KAMINA" type, since it suffices for this purpose to place a tube for the exhaust of the fumes at at least one end of the conveyance channel (5). On the other hand, when the lid according to the invention is to be used on batteries of the "re-combination" type, it is sufficient to insert at the end of the re-conveyance channel (5) at least one one-way valve and sealing means such as OR rings under each cap (11).

5 Claims, 1 Drawing Sheet

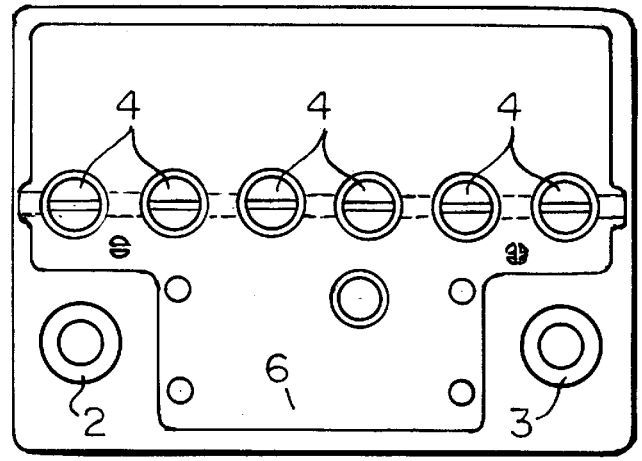
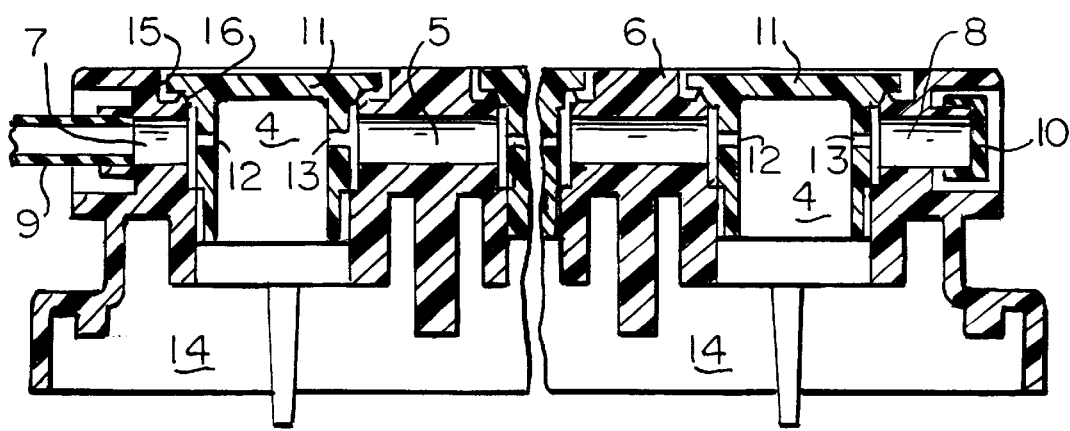
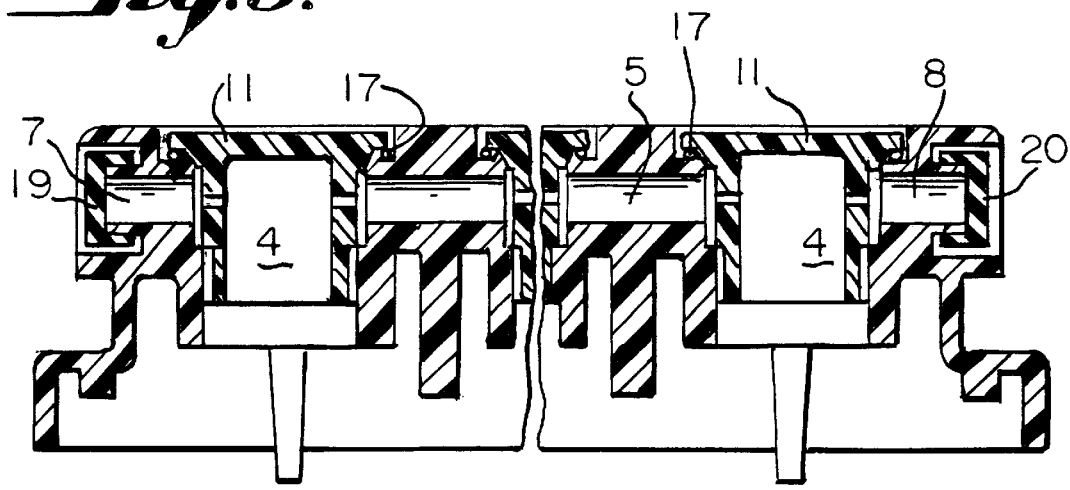

LID FOR BATTERIES

The invention concerns a lid for batteries which can be indifferently used on batteries of the "KAMINA" type or on the so-called "re-combination" type.

The batteries of the "KAMINA" type are batteries realized according to the instructions given in the patent G9101356.9 belonging to the German Company MOLL GMBH. These batteries are used in special environmental contexts, e.g. where it is advisable to prevent the fumes developed during the battery performance from being discharged in the environment wherein the batteries operate. It is for this reason that the batteries of the "KAMINA" type present a lid having in its interior a gas-conveying channel, which setting each one of the battery elements into communication with the others. The channel presents at least one hole on the rim of the battery lid on which a tube is attached which has the task of collecting and exhausting the fumes developed in the interior of the elements during the battery performance or during its recharging. The channel connecting each element is preferably realized in correspondence of the middle line of the alignment of the refilling holes of each element. Each cap inserted in said holes, presents on its cylindrical wall at least one hole for communicating with the conveying channel, thus assuring the connection between adjacent sections of the channel. Therefore, it is easy to understand, that the fumes developed on each element pass through the holes of each cap of the battery element, and, through said holes, they reach the collector channel which then conveys the fumes, such as hydrogen, to the external environment, through one or two tubes connected at the end of said channel. Therefore, any danger of deflagration, because of hydrogen accumulation, or pollution of the environment is avoided. With regard instead to the so-called "re-combination" batteries, these are realized according to working principles which foresee a special separator arranged between two plates in each element. Each of the elements composing the battery is hermetically sealed, so that the fumes developed because of electrochemical reactions are blocked in the interior and used for the chemical reactions operating the regeneration of the battery itself, said fumes re-combining with the ions produced during the electrochemical processes.

With the purpose of avoiding that in the battery or in one or more elements of the same conditions will arise such as to produce gas at high pressure, because of some overheating phenomenon due, for instance to the power output over the allowed limits or other, the battery is supplied, in each battery element, with a one-way valve for gas exhaustion, so that the battery is always protected against the above mentioned phenomenons. In the "re-combination" batteries usually there are no caps for the refill of the electrolyte, since the re-combination does not foresee the refilling of the electrolyte. Therefore, the lid of the "re-combination" batteries presents a seal being hermetical in relation to the container and to its elements, with the only the one-way valves for the exhaust of possible internal overpressures, as already mentioned.

Consequently, the present technique foresees two different lids for the battery containers, one used for the batteries of the "KAMINA" type, foreseeing the exhaust of the fumes into the external environment through the collector tube, the other lid for the batteries of the "re-combination" type, having requirements of hermetic seal and exhaust valves.

SUMMARY OF THE INVENTION.

It is the purpose of the invention is to obtain a lid for batteries realized in a single-molding piece which can be advantageously used both to produce the mentioned batteries of the "KAMINA" type and to produce the "re-combination" batteries.

Therefore the intended purpose is to obtain two lids having different final characteristics beginning from the standard mold itself, the final articles being differentiated by adding other elements in order to make the lids compatible with the two different types of batteries.

All the purposes now described and others which will be better explained hereinafter, are reached by the lid according to the invention, which, in accordance with the content of the main claim comprises:

an essentially flat surface provided with a rim suited to be connected to the box of the container of the battery by means of welding or gluing;

a series of holes, aligned in relation to one another, each of them communicating with each element of the battery;

a plurality of caps, each lodging in each of said holes and each of them having at least one hole suited to set into communication contiguous sections of a channel for the conveyance of the fumes generated in the battery;

at least one channel for conveying the fumes generated by the battery, being realized under the external surface of the lid, setting into communication each element of the battery and having its ends facing the external surface of the lid, characterized in that at least one end of said at least one channel is closed by a one-way valve which lets out the fumes accumulated in the interior of the battery when a pre-set pressure has built up, either one more one-way valve, or one sealing cap which prevents the fumes from leaking being present at the other end, the hermetic sealing toward the exterior of said lid being granted by sealing means which are present under the head of each cap inserted in each hole belonging to the lid.

Advantageously, according to the invention, with the plastic manufact realized in one single mold, it is possible to obtain that when it is necessary to produce a battery having the right requirements for collecting the fumes produced during the performance or the recharging and then conveying the same to the external environment through a tube, it suffices to connect at least one tube with one end of the channel present in the lid of the battery, the other end being provided with a cap when is not connected with the conveyance tube, while all the sealing caps of the refilling holes of the battery are such as to assure a good sealing, obtained, for instance, with conic surfaces for the coupling between the cap and the hole opening.

On the other hand, should it be necessary to use the lid for manufacturing batteries of the "re-combination" type, the ends of the channel protruding from the rim of the lid will be closed with at least one one-way valve, consisting of a cap made of flexible plastic material or rubber, for instance, the other end of the channel being closed by means of caps. The sealing caps of the refilling holes, no more needed now, will be sealed through sealing means present under the head of each cap, such as OR rings or similar.

The advantage obtained with the manufact according to the invention is evident, since, with regard to the realization of the batteries of the "KAMINA" type, the lid does not turn out to be essentially modified by the present embodiments except for marginal modifications. With regard instead to the lid according to the invention used in the "re-combination" batteries, it can be observed that the valves used up to now, at the rate of one for each battery element, are drastically reduced, since only two valves at the most are present at the ends of the internal conveyance channel the lid is provided with, and, since it is sufficient to insert in the caps OR rings or similar in order to make the lid hermetic. Then, by placing or not sealing means in the caps and exhaust valves at the ends of the connection, it is possible to pass from manufacturing the "KAMINA" lid to the "re-combination" lid. This with the extreme advantage both from the point of view of assembling the pieces and also of the low-cost with regard to the "re-combination" lid, which at present is realized with special molds and, above all, presents also one-way valves in the same quantity of the number of the elements constituting the battery.

Another advantage which is to be pointed out by manufacturing the lid according to the invention is that, when obtaining the "re-combination" battery, the same pressure is stabilized in each element through the channel connecting all the elements constituting the battery, and this is in obvious favour of the battery life span.

Moreover, it is possible to connect more batteries side by side through tubes, by placing only two valves at the beginning and at the end of the chain of conveyance channels. This always has the obvious advantage of equalizing the pressures in each of the single elements of the battery.

Besides, the pressure stabilization obtained with the lid according to the invention in all of the battery elements in the "re-combination" batteries permits to use lids and battery containers moulded in polypropylene instead of ABS, as in lids and containers used at present, thus realizing a reduction in the production costs of the manufactured articles.

BRIEF DESCRIPTION OF THE DRAWINGS

Further characteristics and advantages of the present invention will become apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description and from the drawings, wherein:

FIG. 1 shows the lid according to the invention as a whole;

FIG. 2 shows a magnified section of the lid of FIG. 1 ready to be assembled on batteries of the "KAMINA" type;

FIG. 3 shows the lid of FIG. 1 ready to be assembled on batteries of the "re-combination" type.

DESCRIPTION OF THE INVENTION

With reference to FIG. 1, it can be observed that the lid according to the invention, preferably moulded in polypropylene and indicated as a whole with 1, presents two holes for the passage of the poles, indicated with 2 and 3, and a further series of aligned holes 4, being in the same number as the number of the elements constituting the battery, which in the case of the example are six.

With reference to FIG. 2, it can be observed that the lid 1 presents in its lower part a conveyance channel 5 passing through the middle of the alignment of the holes 4 and arranged under the surface 6 of the lid 1. The ends of the channel 5, indicated with 7 and 8 in FIG. 2, are connected with a tube 9 with regard to the end 7, and closed by a cap 10 with regard to the end 8, as in the case of the example. Each hole 4 is supplied with a cap 11 presenting two holes 12 and 13 being in a diametrically opposed position, such as to insure the passage of the fumes coming from each element, indicated with 14, into the collecting channel 5, so that the fumes developed by each element 14 can be conveyed to the exterior through the exhaust tube 9.

Advantageously each hole 4 presents in its upper part an enlarged section 15 suited to house the head of the cap 11. The bottom of such enlarged mouth presents a flat annular part and an annular projection 16 having an essentially triangular profile. In this way said profile 16 realizes at one end a truncated-conic mouth for the cap which has under its head an equivalent shape so that during the screwing of the cap into the hole an essentially hermetic seal is obtained. On the other end, the annular projection 16 defines the housing for an OR ring. The lid now described and represented in FIG. 2 is a lid essentially suitable for batteries of the "KAMINA" type.

With regard instead to the assembly of lids suited to be arranged on batteries of the "re-combination" type, it can be observed that the seal necessary for obtaining an hermetic sealing in relation to the exterior is realized by inserting an OR ring 17 under each head of each hole 11 and positioning it between the flat part of the bottom 15 and the annular projection 16. In this way, when the lid 11 is screwed into the housing of the hole 4, the OR ring is squeezed in, thus obtaining the hermetic sealing of the holes.

With regard to the ends 7 and 8 of the channel 5, which is also present in the lid of FIG. 3, since the same moulded material is used, these are provided, instead, with two one-way valves 19 and 20 and are able to let out the fumes accumulated within the battery elements,? whenever their pressure exceeds a pre-set value. Of course, it does not make any difference if one of the two one-way valves, for instance the valve 20, is replaced with a plain sealing cap which prevents the fumes from leaking.

It has been noticed that by adding OR rings and one or two valves at the ends of the conveyance channel present in the lid, it is possible to transform a lid suited to be assembled on batteries of the "KAMINA" type into a lid suited for the batteries of the "re-combination" type.

I claim:

1. A lid for a recombination battery having battery elements in a container box for recombining fumes produced in said lid comprising:

a flat surface portion having a depending peripheral rim for integral connection with the container by forming a confining closure therewith, said surface portion being formed with a series of holes aligned in relation to one another, each of which communicate with a corresponding element of the battery;

a plurality of caps, one each secured in a corresponding hole having at least one transverse opening therein;

at least one channel formed in the lower surface of the lid in communication with at least one transverse opening in each cap forming contiguous sections for conveying fumes generated in the battery, said at least one channel having end portions communicating externally of the lid;

a closure for each end of said at least one channel for preventing in flow to the channel from exterior of the lid, at least one of said closures comprising a one-way valve which allows fumes accumulated in interior of the battery to escape when a preset pressure is reached; and a sealing means for sealing each cap in its corresponding hole in the lid.

2. The lid according to claim 1, wherein the holes formed in the lid comprise refilling holes for each element of the battery.

3. The lid according to claim 1, wherein each of said caps has a conical profile and said holes each have a truncated-conic rim portion for engaging the conical portion of the cap including a flattened portion.

4. The lid according to claim 1, being formed of polypropylene.

5. The lid according to claim 1, wherein the sealing means comprises an O-ring.

* * * * *